(12) United States Patent  
Abramovich et al.

(10) Patent No.: US 9,536,127 B2  
(45) Date of Patent: *Jan. 3, 2017

(54) APPARATUS AND METHOD FOR CONTACTLESS HIGH RESOLUTION HANDPRINT CAPTURE

(71) Applicant: General Electric Company, Schenectady, NY (US)

(72) Inventors: Gil Abramovich, Niskayuna, NY (US); Kevin George Harding, Niskayuna, NY (US); Joseph Czechowski, III, Clifton Park, NY (US); Frederick Wilson Wheeler, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/624,639

(22) Filed: Feb. 18, 2015

(65) Prior Publication Data

US 2015/0178546 A1 Jun. 25, 2015

Related U.S. Application Data

(63) Continuation of application No. 13/075,694, filed on Mar. 30, 2011, now Pat. No. 8,971,588.

(51) Int. Cl.
*G06K 9/00* (2006.01)
*G02B 5/30* (2006.01)

(52) U.S. Cl.
CPC ....... *G06K 9/00033* (2013.01); *G06K 9/00026* (2013.01); *G02B 5/3025* (2013.01)

(58) Field of Classification Search
CPC ....... G02B 5/3025; G02B 5/30; G02B 5/3008; G02B 5/3016; G02B 5/3083; G02B 5/32; G06K 9/00033; G06K 9/00006; G06K 9/00013; G06K 9/0002; G06K 9/00026; G06K 9/0004; G06K 9/00053; G06K 2009/0006; G06K 9/00087; G06K 9/00107; G06K 9/00114; G06K 9/0012; G06K 2009/00932; G06K 2009/00953; A61B 5/1172; G06F 17/30784; G02F 1/0018; G02F 1/0027; G02F 1/0036; G02F 1/0045; G02F 1/0063; G02F 1/0081; G02F 1/01

See application file for complete search history.

(56) References Cited

U.S. PATENT DOCUMENTS 4,920,418 A * 4/1990 Robinson ............. H04N 5/2259 348/219.1
5,561,460 A * 10/1996 Katoh .................. H04N 5/2254 348/219.1

(Continued)

FOREIGN PATENT DOCUMENTS

DE 102006013316 A1 9/2006
EP 1805690 B1 4/2008

(Continued)

OTHER PUBLICATIONS

"3-D light system revolutionizes way fingerprints are taken," Layer 8, Mar. 12, 2009, http://www.networkworld.com/community/node/39654, pp. 1-4.

(Continued)

*Primary Examiner* — Avinash Yentrapati
(74) *Attorney, Agent, or Firm* — Ziolkowski Patent Solutions Group, SC; Jean K. Testa

(57) ABSTRACT

A system and method for contactless handprint capture is disclosed that includes an image capture device to capture handprint images of a subject hand at each of a plurality of different focal distances, with the image capture device including an imaging camera and an electro-optics arrange- (Continued)

ment having a plurality of light modulating elements and polarization sensitive optical elements having differing optical path lengths based on polarization states. A control system is coupled to the image capture device to cause the device to capture the handprint images at each of the different focal distances, with each handprint image having a depth-of-focus that overlaps with a depth-of-focus of handprint images at adjacent focal distances such that redundant handprint image data is captured. The control system registers each handprint image with positional data and creates a composite handprint image from the handprint images captured at the different focal distances.

24 Claims, 5 Drawing Sheets

(56) References Cited

U.S. PATENT DOCUMENTS

| | | | |
|---|---|---|---|
| 5,912,768 A | 6/1999 | Sissom et al. | |
| 6,075,235 A * | 6/2000 | Chun | G01J 4/04 250/208.1 |
| 6,483,932 B1 * | 11/2002 | Martinez | G06K 9/00026 283/68 |
| 6,700,606 B1 * | 3/2004 | Borza | G06K 9/00013 348/218.1 |
| 7,075,059 B2 | 7/2006 | Oldham | G01N 21/6458 250/208.1 |
| 7,227,984 B2 * | 6/2007 | Cavan | G06T 3/4069 356/237.1 |
| 7,916,971 B2 * | 3/2011 | Bigioi | G03B 19/02 382/103 |
| 8,120,642 B2 * | 2/2012 | Jelinek | G06K 9/00026 348/36 |
| 8,180,179 B2 * | 5/2012 | Muramatsu | H04N 1/40068 382/299 |
| 8,547,426 B2 * | 10/2013 | Hamre | G07C 9/00158 340/5.82 |
| 8,624,971 B2 * | 1/2014 | Brown | G01N 21/9501 348/126 |
| 2002/0131624 A1 | 9/2002 | Shapiro et al. | |
| 2004/0175028 A1 * | 9/2004 | Cavan | G06T 3/4069 382/145 |
| 2005/0056768 A1 * | 3/2005 | Oldham | G01N 21/6458 250/208.1 |
| 2005/0265586 A1 | 12/2005 | Rowe et al. | |
| 2006/0182318 A1 * | 8/2006 | Shigeta | G06K 9/00026 382/124 |
| 2006/0233427 A1 * | 10/2006 | Hauke | G06K 9/00033 382/124 |
| 2008/0007507 A1 | 1/2008 | Kim et al. | |
| 2008/0101664 A1 * | 5/2008 | Perez | G06K 9/00033 382/125 |
| 2009/0080709 A1 | 3/2009 | Rowe et al. | |
| 2009/0226054 A1 * | 9/2009 | Jelinek | A61B 5/0059 382/126 |
| 2009/0245591 A1 * | 10/2009 | Rowe | G06K 9/2018 382/115 |
| 2010/0008580 A1 * | 1/2010 | Mizuno | G06K 9/2054 382/176 |
| 2010/0020157 A1 * | 1/2010 | Jelinek | G06K 9/00026 348/36 |
| 2010/0046810 A1 * | 2/2010 | Yamada | G06K 9/00026 382/124 |
| 2010/0188655 A1 * | 7/2010 | Brown | G01N 21/9501 356/237.2 |
| 2010/0315499 A1 * | 12/2010 | Maase | G07C 9/00158 348/77 |
| 2011/0064282 A1 * | 3/2011 | Abramovich | G06K 9/00033 382/124 |
| 2012/0076369 A1 * | 3/2012 | Abramovich | G06K 9/00033 382/124 |
| 2013/0011078 A1 * | 1/2013 | Phan | G06T 3/4053 382/279 |
| 2014/0044323 A1 * | 2/2014 | Abramovich | G06K 9/00033 382/124 |

FOREIGN PATENT DOCUMENTS

| | | |
|---|---|---|
| JP | 2001167255 A | 6/2001 |
| JP | 2008048903 A | 3/2008 |
| WO | 2008078895 A1 | 7/2008 |

OTHER PUBLICATIONS

Chen et al., "3D Touchless Fingerprints: Compatibility With Legacy Rolled Images," Abstract, TBS Holding AG, Schindellegistrasse 19CH-8808, Pfaeffikon, Switzerland, pp. 1-6.
"Biometric Detector HITS," S&T Stakeholders Conference, May 21-24, 2007, pp. 1-13.
Kirby et al., "Adaptive Lenses Based on Polarization Modulation," Abstract, Proceedings of SPIE, the International Society for Optical Engineering, Adaptive Optics for Industry and Medicine, International Workshop on Adaptive Optics for Industry and Medicine, Beijing, China, 2005, pp. 1-5.
Favaro et al., "Learning Shape from Defocus," Lecture Notes in Computer Science, vol. 2351, Proceedings of the 7th European Conference on Computer Vision-Part II, Year of Publication: 2002, pp. 735-745.
Watanabe et al., "Real-time computation of depth from defocus," Proc. SPIE, vol. 2599, 1995, pp. 14-25.
Sundareshan, "Computationally Efficient Image Restoration and Super-Resolution Algorithms for Real-Time Implementation," Proc. SPIE, vol. 4719, 2002, pp. 306-317.
Enguehard et al., "Introduction to Laser Guide Star Theory Versus Experiment," Proc. SPIE, vol. 5895, 2005, pp. 1-5.
Abramovich et al., "Mobile, Contactless, Single Shot, Fingerprint Capture System," Proc. SPIE, vol. 7667, 2010, pp. 1-12.
Harding et al., "3D Imaging Systems for Biometric Applications," Proc. of SPIE, vol. 7690, Apr. 6, 2010, pp. 1-12.
EP Search Report and Written Opinion from EP Application No. 12161924.1, dated Aug. 3, 2012.
Scharf, "Refractive Birefringent Optics", Polarized Light in Liquid Crystals and Polymers, Nov. 28, 2006, p. 290, USA.
EP Search Report and Written Opinion from EP Application No. 12161924.1, dated Apr. 4, 2014.

* cited by examiner

APPARATUS AND METHOD FOR CONTACTLESS HIGH RESOLUTION HANDPRINT CAPTURE

CROSS-REFERENCE TO RELATED APPLICATION

The present application is a continuation of and claims priority to U.S. patent application Ser. No. 13/075,694 filed Mar. 30, 2011, the disclosure of which is incorporated herein in its entirety.

BACKGROUND OF THE INVENTION

Embodiments of the invention relate generally to a system and method for biometric data capture, and more particularly to a contactless, high resolution handprint capture device.

It is well known that the patterns and geometry of fingerprints are different for each individual and are unchanged over time. Thus fingerprints serve as extremely accurate identifiers of an individual since they rely on un-modifiable physical attributes. The classification of fingerprints is usually based on certain characteristics such as arch, loop or whorl, with the most distinctive characteristics being the minutiae, the forks, or endings found in the ridges and the overall shape of the ridge flow. More recently, palm prints have also been identified as a potential enhanced means of biometric identification. It is recognized that palm prints can be used in combination with fingerprints to provide still a more foolproof "future modality" of biometrics.

Traditionally, fingerprints have been obtained by means of ink and paper, where a subject covers a surface of their finger with ink and presses/rolls their finger onto paper or a similar surface to produce a rolled fingerprint. More recently, various electronic fingerprint scanning systems have been developed that obtain images of fingerprints utilizing an optical fingerprint image capture technique. Such electronic fingerprint scanning systems have typically been in the form of contact based fingerprint readers that require a subject's finger to be put in contact with a screen and then physically rolled across the screen to provide an optically acquired full rolled-image fingerprint. However, such contact based fingerprint readers have significant drawbacks associated therewith. For example, in a field environment, dirt, grease or other debris may build up on the window of contact based fingerprint readers, so as to generate poor quality fingerprint images. Additionally, such contact based fingerprint readers provide a means of spreading disease or other contamination from one person to another.

In a most recent generation of electronic fingerprint scanning systems, contactless fingerprint readers have been proposed where fingerprints are captured without the need for physical contact with a subject's finger. However, existing contactless fingerprint scanning systems are limited regarding the type of fingerprint images they can acquire. For example, one existing type of contactless fingerprint scanning system is capable of acquiring a single flat image of the finger by utilizing a camera image. Such single flat images, however, do not provide the entire fingerprint data, as the use of one camera image does not allow for capture of a large area of the fingerprint.

Another existing type of contactless fingerprint scanning system acquires full 3D images of the fingers using a method such as structured light. Phase shifted structured light techniques use 3 or more images of the subject with a sine wave pattern projected onto the subject from some angle, with a shift of the pattern of a fraction of the pattern period between images. The projection angle and view angle must be different to create a triangulation effect which limits the ability to capture curved subjects such as fingers and palms. The result of such measurements is detailed 3D object measurement; however, these measurements require a high degree of stability during data capture necessitating careful fixturing of the finger to provide this stability. Additionally, the technique employed to create contrast between fingerprint ridges and valleys of a flat fingerprint image uses a shallow depth-of-field that prevents all areas of the finger, such as the top and sides of the finger, from being in clear focus in the same image.

Still another existing type of contactless fingerprint scanning system was recently described in U.S. patent application Ser. Nos. 12/694,840 and 12/889,663, filed by General Electric (GE) Company. The contactless fingerprint collection system described in the GE applications capture rolled equivalent fingerprint data using a fast switching optical system able to capture a set of images at multiple image depths. Each image has a high resolution focus which individually necessitates a shallow depth-of-field, just as a high-resolution microscope can only focus over a shallow depth at one time. The focus shift is created using a liquid crystal panel (LCP) in connection with a birefringent optical element built into a high-resolution lens system. The LCP is able to switch the polarization of the light in millisecond timescales, such that the polarization of the light rotates by 90 degrees, causing the light to see a different index of refraction in the birefringent optical element that then focuses the system to a different focal distance. Orthonormal projection methods are employed after capture, such the images need not be perfectly registered.

However, there are certain restrictions on the contactless fingerprint collection system described in the GE applications. For example, the contactless fingerprint collection system is configured to only acquire fingerprint images and does not accommodate the collection of palm print images, with the fingerprint images thus only providing rolled equivalent fingerprint data without any such 2D equivalent palm print data. Additionally, a separate camera having a small field-of-view is employed for capturing each individual fingerprint, such that 3D shape information can only be gathered for fingers of the subject and not for the whole hand. Still further, the cameras employed are high resolution cameras having a native resolution of 1000 pixels-per-inch (PPI), thus necessitating use of a 30 mega-pixel or greater camera, adding to the expense of the system. Finally, contactless fingerprint collection system provides registration between multiple depth fingerprint images only in a software-based processing manner, such that the registration is computation/calculation intensive.

As set forth above, in future generations of biometric data capture devices, it may be desirable to capture palm prints as well as fingerprints to provide still a more foolproof modality of biometrics, i.e., capture a whole handprint. Such a handprint capture device would ideally provide for volumetric capture of the hand, with an extended depth of capture so as to enable capture of a plurality of hand shapes and poses and also enable 2D equivalent data of both the fingerprints (i.e., unrolled fingerprints) and the palm print. The handprint capture device would ideally use a lower resolution, lower cost camera that captures an image of the entire hand in one shot, with super-resolution processing being applied to increase resolution to a desired amount (e.g., 1000 PPI), to provide Level IV biometric data performance levels. The handprint capture device would also ideally provide registration between multiple depth handprint images by way of a guide mark-type registration device that lowers the computation/calculation demands of the system and speeds up the registration process.

It would therefore be desirable to design a system and method of acquiring a full contactless handprint image that excludes any contact between the hand and the handprint reader and that provides full rolled equivalent fingerprint data and 2D equivalent palm print data. It would further be desirable for such a system to employ a lower resolution, lower cost camera, with image processing that provides 1000 PPI or greater handprint image resolution.

BRIEF DESCRIPTION OF THE INVENTION

Embodiments of the invention are directed to an apparatus and method for contactless handprint data collection.

According to one aspect of the invention, a contactless biometric data collection device includes an image capture device configured to capture whole handprint images of a subject hand in any of a range of positions and at each of a plurality of different focal distances, with the image capture device further including an imaging camera configured to capture the handprint images at a first image resolution level and an electro-optics arrangement positioned between the hand and the imaging camera, the electro-optics arrangement including a plurality of light modulating elements and polarization sensitive optical elements having an optical path length that changes with different polarization states, so as to provide for capture of the handprint images at each of the plurality of different focal distances. The contactless biometric data collection device also includes a control system coupled to the image capture device that is configured to cause the image capture device to capture the handprint images at each of the plurality of different focal distances, with each handprint image having a depth-of-focus that overlaps with a depth-of-focus of handprint images at adjacent focal distances such that redundant handprint image data is captured. The control system is further configured to register each handprint image with positional data so as to create pixel correspondence between the handprint images and between portions of the hand and create a composite handprint image from the registered handprint images captured at each of the plurality of different focal distances.

According to another aspect of the invention, a method for collecting biometric data of a subject hand in a contactless manner includes capturing an image of at least a portion of the hand at each of a plurality of fixed focus positions by way of an image capture system, wherein each image includes at least one of a palm print and a plurality of fingerprints and wherein each image is captured at a first image resolution level. The method also includes registering the handprint images captured at the plurality of fixed focus positions to create pixel correspondence between the handprint images and combining the images captured at the plurality of fixed focus positions to form a composite image, wherein forming the composite image further includes inputting the images into an image processing algorithm, the images including redundant depth data and lateral image shifts between respective handprint images and generating the composite image from the image processing algorithm, the composite image having a second spatial resolution level that is increased from the first image resolution level.

According to yet another aspect of the invention, a contactless handprint collection device for imaging a handprint includes a positioning assistance device configured to provide feedback to a subject to aid in positioning a hand of the subject to a desired imaging location and an image capture device configured to capture handprint images of the hand at each of a plurality of focus depths from the handprint, with the image capture device further including an imaging camera configured to capture the handprint images at a first spatial resolution level and an electro-optics arrangement positioned between the hand and the imaging camera, the electro-optics arrangement including a plurality of light modulating elements and polarization sensitive optical elements to provide for capture of the handprint images at each of the plurality of different focus depths. The contactless handprint collection device also includes a processor operably connected to the image capture device, with the processor being programmed to control the imaging device to capture handprint images at each of the plurality of focus depths, the handprint images including redundant depth data and lateral image shifts between respective handprint images. The processor is further programmed to register the handprint images captured at the plurality of focus depths to correlate the handprint images, determine a 3D shape of the hand using one of a depth from focus and a depth from defocus algorithm, process the registered handprint images and the 3D shape of the hand to form a composite handprint image having a second spatial resolution level that is increased from the first spatial resolution level of the handprint images, and generate a two-dimensional rolled equivalent image of the handprint from the composite image.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

The operating environment of embodiments of the invention is described below with respect to an apparatus and method for contactless handprint capture. The contactless handprint capture device provides a rolled equivalent handprint image that includes fingerprint and palm print images. In operation, the device rapidly captures a series/plurality of single-shot images of the hand. Each of these images has a small depth of field, such that only a portion of the palm print and finger print regions of the hand can be in focus in any single image. As such, the images of the hand are taken at different and distinct effective focal distances (i.e., "depths") to the hand (e.g., 8 or 16 depths), with each focal distance being separated by a small increment from preceding/subsequent images. The result is that any point of interest on the hand will be well focused in at least one of the images, and possibly in several of the images, such that the series of images will have all of the desired finger and palm print information. It is of course desirable to have a single image of the hand with all regions well focused, and this is accomplished by combining the multiple images collected into one final composite image through processing. The processing system will determine which regions of each image are well focused and then combine the images using well-focused regions from each collected image to make the final composite image. Super-resolution processing may also be used to produce an output composite image with higher resolution than the input images, with the super-resolution processing being especially effective when regions of the hand are well focused in multiple input images. A three-dimensional (3D) model of the handprint is also constructed and is used to unroll the surface pattern data (fingerprints and/or palm print) present in the composite image to the equivalent of a flat image obtained from the hand, with the image having a super-resolution of 1000 pixels-per-inch (PPI) or more.

Figure 1:
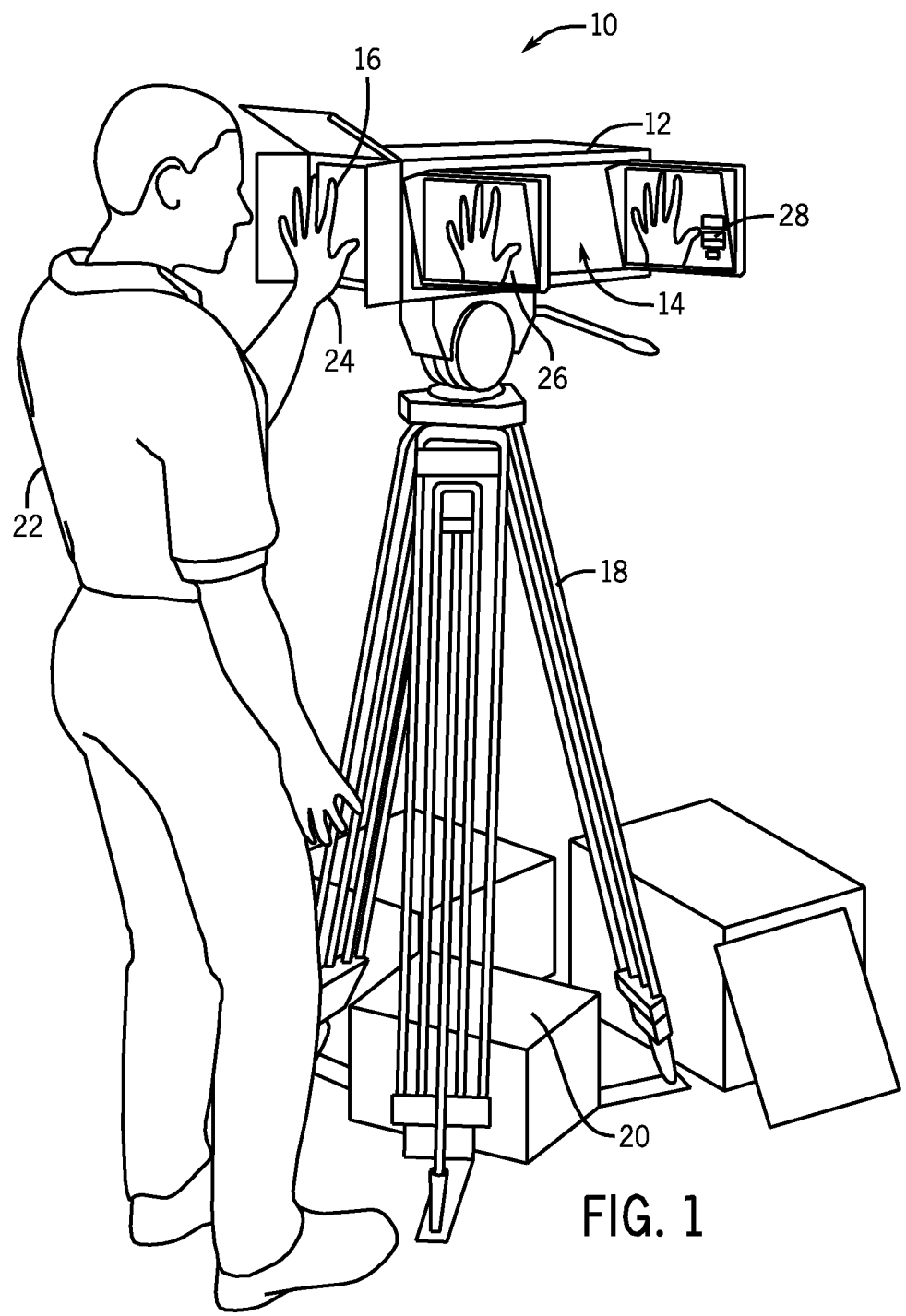
FIG. 1 is a perspective view of a contactless handprint capture device according to an embodiment of the invention.

Referring to FIG. 1, a contactless handprint collection device 10 is shown according to an embodiment of the invention. The device 10 includes an outer housing 12 that encloses an image capture device 14 configured to acquire handprint images from a subject in a contactless manner, as will be described in greater detail below. The housing 12 of contactless handprint collection device 10 includes an imaging window/pane 16 in a front panel thereof that provides for imaging of a hand by way of image capture device 14.

According to an embodiment of the invention, handprint collection device 10 is configured as a portable device that is transportable to and useable in various environments. A base 18 is included on handprint collection device 10 on which housing 12 and image capture device 14 are mounted, with the base 18 preferably being configured as an adjustable and collapsible base that provides ease of transportation and increases functionality of the handprint collection device 10. As shown in FIG. 1, base 18 can be in the form of a ruggedized tripod, according to one embodiment, although other suitable base designs are also envisioned as being within the scope of the invention. A portable power source 20, such as a battery, is also included in handprint collection device 10 and is used to power image capture device 14 and other electronics of the handprint collection device 10, thus providing for operation of device 10 in environments without access to an electrical grid.

In operation of device 10, a subject 22 positions a hand 24 in proximity to imaging window 16 to allow the image capture device 14 to collect images of the subject's hand once the hand is in position, such that multiple fingerprints and a palm print (i.e., a handprint) are acquired in a contactless manner. It is recognized that, in order for the contactless handprint collection device 10 to acquire handprint data from subject 22, the hand 24 of the subject must be properly positioned in proximity to imaging window 16 and relative to the image capture devices 14. That is, it is recognized that hand 24 must be properly positioned a desired/designated distance from the image capture device 14, so as to accommodate in-focus images of the hand at a specified focal distance or depth. To achieve this, a user viewing monitor 26 and proximity sensing system 27 (FIG. 2) are provided on handprint collection device 10. User viewing monitor 26 functions as a positioning assistance device by providing feedback to subject 22 to properly position and orient their hand 24 proximate to imaging window 16, while proximity sensing system 27 senses a position of the subject's hand 24 relative to the image capture device 14 and, according to one embodiment, automatically triggers the data collection when the hand is in the correct position to allow for image capture. According to an embodiment of the invention, the user viewing monitor 26 displays the hand relative to a marker indicative of a desired hand position and provides a visual indication or alert to subject 22 when their hand 24 is in an acceptable position for imaging by image capture device 14. Also, according to one embodiment, proximity sensing system 27 further includes a hand tracking device or capability that provides for tracking a location of the hand relative to the image capture device 14 so as to provide feedback to the subject regarding the proximity of the hand to a desired imaging location.

As further shown in FIG. 1, an operator control monitor 28 is also included on handprint collection device 10. Operator control monitor 28 is positioned and configured to provide an operator with the capability to initiate a hand-scan procedure and view resulting data from such a scan. For example, operator control monitor 28 may provide feedback to the operator regarding positioning of the subject's hand 24 relative to the image capture device 14 during initiation a hand-scan procedure, such that operator may assist and instruct subject in positioning their hand. Upon completion of the hand-scan procedure, operator control monitor 28 may also provide resulting data and information on the captured handprint to the operator, including for example if the handprint matches any handprints stored in a handprint database.

Figure 2:
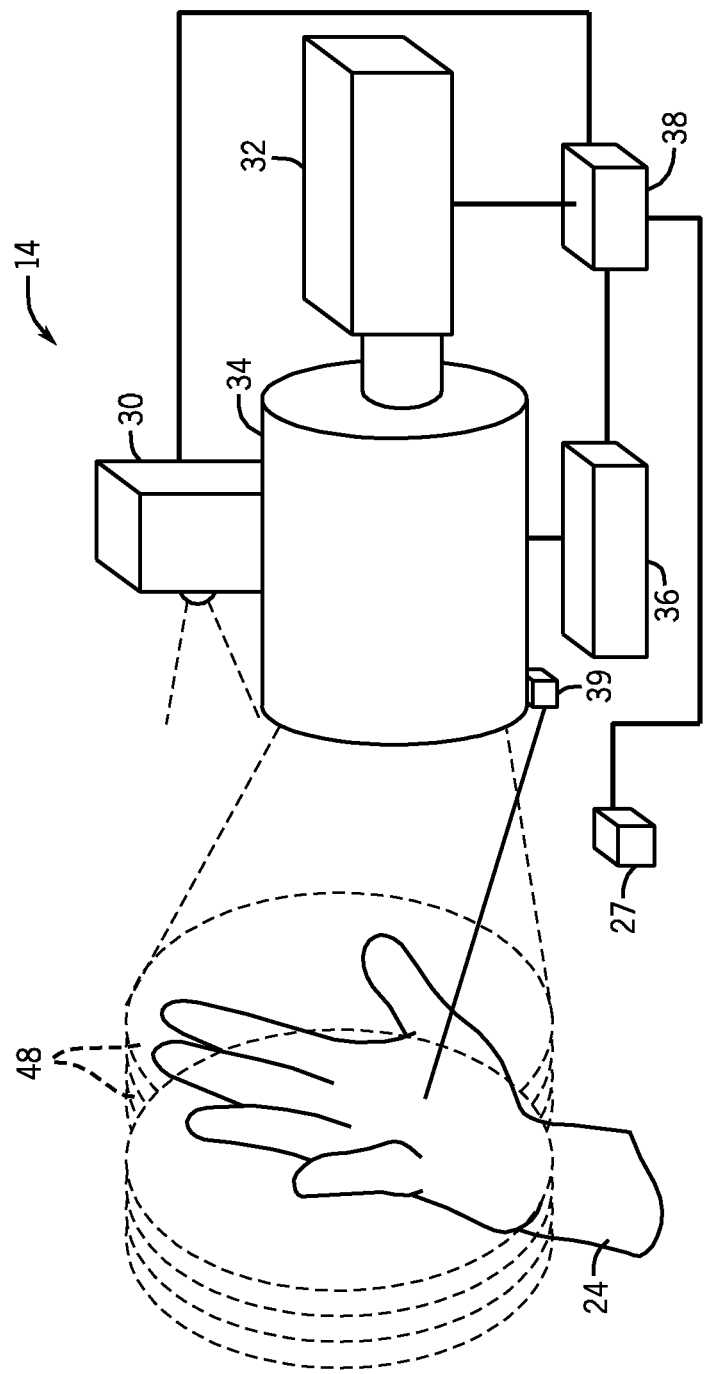
FIG. 2 is a block schematic diagram of an image capture device included in the contactless handprint capture device of FIG. 1 according to an embodiment of the invention.

Referring now to FIG. 2, a block schematic diagram of image capture device 14 is shown according to an embodiment of the invention. Image capture device 14 includes a light source 30, a camera 32, and electro-optics 34, that function together to collect a plurality of handprint images taken at different effective focal distances to the hand. A voltage source 36 is provided that selectively provides power to individual components of electro-optics 34, and a control system or processor 38 is provided to control operation of image capture device 14. Processor 38 controls operation of light source 30, camera 32, electro-optics 34, and voltage source 36 to capture the plurality of handprint images taken at different effective focal distances to the hand and also performs subsequent image processing of the captured images in order to provide a high-resolution composite image of the handprint, as will be explained in detail below.

According to an embodiment of the invention, light source 30 is provided as a strobed light emitting diode (LED) light source that provides a high power beam of light and that can be quickly and dynamically controlled to emit bursts/pulses of light. Camera 32 is in the form of a readily available commercial camera, such as a 16 megapixel camera capable of providing 600 pixels-per-inch (PPI) image resolution of the hand image, for example. It is envisioned, however, that a camera with a higher or lower resolution than 600 PPI could also be used in image capture device 14, with a camera having 500 PPI or greater being desired based on practical considerations. Camera 32 is configured to acquire images having a high-resolution focus that necessitates a shallow depth-of-field (DOF). The electro-optics 34 provide the focus shift between each of the images acquired by camera 32, with the electro-optics being configured to provide 8 or 16 focus shifts with shifts in focal distance (range) that provide redundant image information. The redundant image information will be analyzed according to super resolution methods to provide a final image resolution that is increased as compared to that of the native resolution of camera 32. According to one embodiment, final image resolution is up to approximately twice that of the native resolution of camera 32, such as a final image resolution of 1000 PPI, for example.

Referring still to FIG. 2, image capture device 14 also includes a fixed target generator 39 that is configured to generate a reference target point on hand 24 of the subject. According to one embodiment, target generator 39 is in the form of a laser generator configured to direct a laser beam spot or other projected target onto the hand 24. Since the direction and position of the laser generator 39 is fixed relative to the camera 32, the images acquired by the camera 32 can be corrected for any shifts of the hand 24 relative to the camera 32 that might occur during handprint image capture. Fixed target generator 39 thus operates similar to a guide star type reference used in telescope imaging, as generator 39 adds a fixed target to acquired images to serve as a reference that will connect the subject and camera. The inclusion of target generator 39 thus makes image capture device 14 robust to small hand motions.

Figure 3:
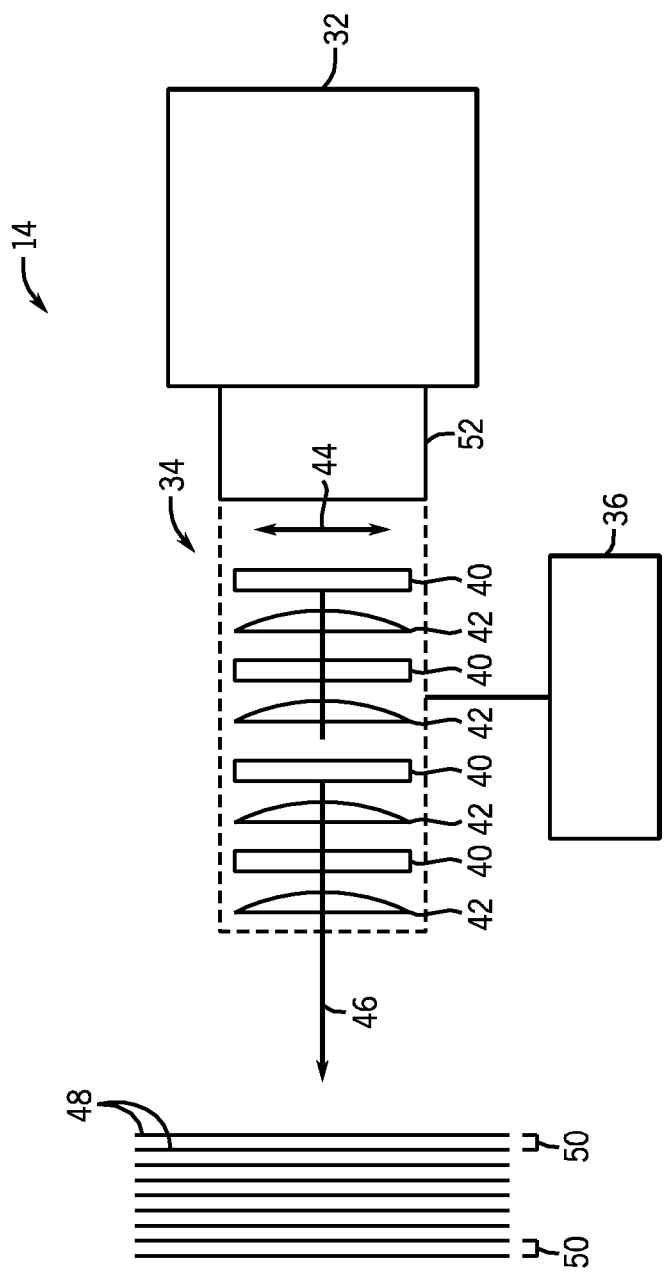
FIG. 3 is a representation of a multi-stage electro-optics arrangement having multiple liquid crystal panel (LCP) and birefringent elements for producing 8 or 16 focal distances and that is usable with the image capture device of FIG. 2 according to an embodiment of the invention.

Referring now to FIG. 3, the electro-optics 34 of an image capture device 14 (FIG. 1) is shown according to one embodiment of the invention, with the electro-optics 34 including a plurality of polarization sensitive optical elements 40 and a plurality of light modulating elements 42. The light modulating elements 42 may be in the form of Faraday rotators, optoelectric crystals, wave plates, or liquid crystal panels (LCPs), for example. The polarization sensitive optical elements 40 are elements whose optical path length is dependent upon the orientation of the polarization of the light, such as a birefringent window or birefringent lens, to enable capture of the plurality of handprint images at the different focal distances. The polarization sensitive optical elements 40 may comprise a transparent material such as, quartz, lithium niobate, calcite, yttrium orthovanadate, or another suitable like material, and are cut with a fast axis 44 perpendicular to the optical axis 46 of the image capture device 14. When the incoming light is polarized along the fast axis 44, the optical path is equal to L times $n_o$, and when the incoming light is perpendicular to the fast axis 44, the optical path is equal to L times $n_e$. The term L refers to the distance between elements, and the terms $n_o$ and $n_e$ refer to the refractive indices for polarizations perpendicular (ordinary) and parallel (extraordinary) to the axis of anisotropy respectively. In the case of crystal quartz, the index shift between the two orientations is around 0.018 RIU (refractive index units), such that a window, which is one centimeter thick, can provide a change in path length of 0.18 millimeters. Calcite has an index shift of about 0.16 RIU for an image shift of 1.6 millimeters for a 1-centimeter thick window. In comparison lithium niobate has an index shift of nearly 0.2 RIU, producing potential shifts of 1.9 millimeters compared to calcites' 1.6 millimeter.

As shown in FIG. 3, the electro-optics 34 is configured as a multi-stage shifting apparatus. According to the embodiment of FIG. 3, electro-optics 34 includes a plurality of LCPs 42 and birefringent optical elements 40 that provide for up to 8 to 16 focus planes, identified as 48, with redundancy between the planes so as to allow for a large number of images of the hand to be acquired (i.e., oversampling), although it is recognized that other light modulating elements 42 and polarization sensitive optical elements 40 could be used in place of the LCPs and birefringent elements. In operation, a supplied electronic signal (i.e., voltage) from voltage source 36 is used to control the polarization rotation caused by the LCPs 42. One or more different voltages are applied to the LCPs 42 so as to cause a change in the orientation states thereof (i.e., cause the polarization rotation to change). Subsequently, this causes the light reflected from the handprint to see a different index of refraction path (i.e., rotate the linear polarization of light) within the birefringent elements 40, resulting in different optical path lengths. According to one embodiment, the electronic signal is supplied such that each LCP 42 is able to switch the polarization of the light in millisecond timescales. When the polarization of the light rotates by 90 degrees, the light sees a different index of refraction in the birefringent optical elements 40, which then focuses image capture device 14 to a different effective focal distance/plane 48. Any variation in the optical path length results in changes in the focus/defocus on the images acquired by camera 32, similar to a physical change in the distance between the hand 24 and the camera 32.

It is recognized that each added LCP 42 and birefringent element 40 doubles the number of fixed focus positions 44 that can be produced by the image capture device 14. Thus, for an image capture device 14 having electro-optics 34 that include three LCPs 42, eight separate focus planes 48 would be provided, whereas for an image capture device 14 having electro-optics 34 that include four LCPs 42, sixteen separate focus planes 48 would be provided. Using a focus step 50 of 2.5 millimeters between focus planes 48, eight images would provide a 20-millimeter range volume, and using 16 images would provide 40 millimeters of range (over 1.5 inches of capture range). With a significantly enhanced capture depth, the ability to separately capture local regions of the hand 24 (FIG. 2) becomes unnecessary as every region on the hand can fall within the capture range, even allowing for some variation in hand position and shape. User feedback and distance sensing can still be used to select the best position for data collection.

Various configurations of electro-optics 34 may be included in image capture device 14, however, each of the configurations includes LCPs 42 and birefringent optical elements 40 that are positioned between the camera 32 and the subject's hand 24 to change the optical path length of the image capture device 14. It is recognized that each additional stage of LCPs 42 added to electro-optics 34 decreases the intensity of light reflected back from the hand 24 and received by camera 32. That is, there is a potential light loss of about 30 percent with each stage of LCPs 42. However, the light loss is mitigated by a higher power light, such as the strobed LED light source 30 (FIG. 2) provided in image capture device 14. It is further recognized that image capture device 14 may comprise additional components beyond the LCPs 42 and birefringent elements 40 set forth above. For example, a lens 52 may be used in combination with the LCPs 42, with an effective focal position of the combination when voltage is applied to the LCPs 42. Other components such as additional lens, mirrors, light filters, apertures, illuminating devices, and electronic components, are also envisioned as being included in image capture device 14.

Additionally, in certain embodiments, one or more polarizers (not shown) may be included in electro-optics 34 to orient the polarization of the light from an LCP 42 and birefringent element 40. In certain embodiments polarization may be applied to measure both specular and diffuse reflection, specifically wherein the polarized light is focused on a blue wavelength and a red wavelength region. Measurements of the specular and diffuse reflection may be used to differentiate authentic fingerprints and palm prints from a forgery wherein the forgery uses a fake finger material that responds differently to the polarized light than does a real finger. That is, fingers are known to diffuse light of different wavelengths differently so as to act more as a translucent material that scatters light in all directions versus a specular material that reflects light in a consistent direction. Light having a red wavelength component penetrates deeper into a live finger where it becomes diffuse, producing a different character of the light with lower polarization than light with a blue wavelength component that reflects from the surface of the finger and maintains a higher degree of polarization. The difference in light penetration between the blue and red wavelengths, and thus the contrast seen on the features of the finger (the interior light makes the finger glow, reducing surface contrast) may be sufficient to authenticate real fingerprints from a spoof fingerprint.

With continued reference back to FIGS. 1-3, operation of handprint capture device 10 is set forth in detail here below. In system operation, the subject 22 places their hand 24 in a particular orientation relative to image capture device 14 as directed by an operator and by using simple feedback from the handprint capture device 10, such as by way of user viewing monitor 26. As the system is a volumetric capture device, an exact positioning of the hand relative to image capture device 14 is not required, but rather hand 24 need only be placed in proximity to imaging window 16 and in a general shape/pose that exposes the handprint to image capture device 14. That is, handprint capture device 10 provides for volumetric capture of the hand, with an extended depth of capture so as to enable capture of a plurality of hand shapes and poses.

Upon placement of hand 24 in a desired location, handprint capture device 10 then captures multiple (e.g., 8 or 16) handprint images in a fast sequence using image capture device 14, with the handprint images being captured at different focal distances by controlling operation of electro-optics 34 in the image capture device. That is, a supplied electronic signal (i.e., voltage) from voltage source 36 is used to control the polarization rotation caused by light modulating elements 42 in electro-optics 34, with one or more different voltages being applied to the light modulating elements 42 so as to cause the polarization rotation to change. This causes the light to see a different index of refraction path within the polarization sensitive optical elements 40, resulting in different optical path lengths. Any variation in the optical path length results in changes in the focus/defocus on the images acquired by camera 32, similar to a physical change in the distance between the hand 24 and the camera 32, and providing for capturing of a plurality of handprint images, such as 8 or 16 images, at different focal distances or fixed focus positions 48.

Each handprint image is separated in range or depth from the previous image by a set amount, i.e., a focus step 50 (FIG. 3), and is optimally focused over a depth-of-field comparable to the separation of the focus planes. That is, the depth-of-focus of each handprint image that is captured is approximately equal to a size of the focus step 50 between each fixed focus position or imaging plane 48. According to one embodiment, a focus step of 2.5 millimeters is implemented, such that eight images would provide a 20-millimeter range volume, and using 16 images would provide 40 millimeters of range (over 1.5 inches of capture range). With a significantly enhanced capture depth of up to 40 millimeters, the ability to separately capture local regions of the hand becomes unnecessary, as every region on the hand can fall within the volumetric capture range, even allowing for some variation in hand position and shape. With the depth-of-focus of each handprint image that is captured being approximately equal to the size of the focus step 50 between each fixed focus position 48, redundant depth/range data is captured in the plurality of handprint images. This redundant data means that every region on the hand can fall within the capture range of some image, with the redundancy between the planes also providing for image oversampling.

In addition to the handprint images captured having shifts in focal distance (i.e., depth/range), each of the handprint images that is captured also includes a small, lateral shift as compared to each other handprint image that is captured. The redundant handprint image data can purposely be made to have these small, known lateral shifts introduced by the polarization sensitive optical elements 42, such that a small spiral of images is generated. The small shifts, less that a pixel in size, are referred to as sub-pixel shifts and function to generate the necessary images needed for use in super resolution enhancement of the captured handprint images. The sub-pixel shifts are achieved in the present system by way of the fast image switching electro-optics arrangement/system 34, which has the capability to switch between different focus positions 48 as well as provide lateral image shifts, either by small de-centering of the lenses or by the use of small optical wedges. The small lateral shifts of the images permits roughly a doubling of the effective image resolution based upon the sub-pixel sampling.

In operation, handprint capture device 10 functions to register the handprint image captured at each different focal distance/fixed focus position 48 with positional data so as to create pixel correspondence between the handprint images and to provide registration between portions of the hand (i.e., between fingerprints and palm print), so as to generate "registered handprint images." That is, it is recognized that any movement of the hand during image capture may be interpreted as a shift of the image, so the image needs to be stabilized relative to the hand position, such that small image shifts can be maintained in a controlled manner. Each image is thus registered for position using a fixed reference target point projected onto the hand that is identifiable in each handprint image, such as a laser beam spot generated by fixed target generator 39. Since the direction and position of the fixed reference target point is fixed relative to the camera, the handprint image can be corrected for shifts of the hand relative to the camera. The desired image shift can then be introduced in a controlled manner within the sensor system. This image stabilization and registration is primarily to account for lateral shifts, but could provide information relative to focal distance changes and, if a simple cross is projected, even hand pose. However, as the system is already collecting range information across the image, any additional range data is redundant.

In addition to capturing the plurality of handprint images at each of the different fixed focus positions at different focal distances and the registration of each of those images with positional data to provide "registered handprint images," handprint capture device 10 also functions to determine a 3D shape of the hand. That is, a contour map or "depth map" of the hand is calculated/generated using one of a depth from focus (DFF) algorithm and a depth from defocus (DFD) algorithm. The DFF analysis/calculation is an image analysis method combining multiple images captured at different focus distances to provide a 3D map correlating in-focus locations in each image with a known focus distance the specific image was captured at. The DFD analysis/calculation is an image analysis method combining the multiple handprint images captured at the different focus distances for calculating depth information by computing the degree of defocus blur in the images. That is, the DFD analysis/calculation uses the amount of defocus and the inherent impulse response function of the imaging device lens (i.e., how images change with focus for that lens) to provide range information. In DFD, the blur is typically modeled as a convolution of the in-focus image and an effective point spread function that can be calculated geometrically from:

$$R=\{D/2\}\times\{1/f-1/o-1/s\} \quad \text{[Eqn.1]},$$

where R is the blur radius, D the diameter of the collection aperture, f the focal length of the lens, o the object distance to the subject, and s the image distance to the sensor.

Ideally, to maintain quality in DFF/DFD, the depth covered can be more than the depth of the hand, which provides flexibility in the actual location of the hand. That is, there should be an image collected at the two ends beyond the expected full range of image (i.e., beyond the far and near range points), plus one near the center to help remove any ambiguities in the range data. Beneficially, limiting the number of images used can reduce the processing needed to obtain sufficient 3D shape information on the hand; however, to collect the highest possible resolution data on the subject, it is desirable to collect a full set of clear images (each set made up of the phase shifted images) through the depth of the subject. To obtain good 3D data from DFF/DFD, the depth-of-field of the images used is controlled. To achieve depth information from the focus quality of the image, the system must be able to see a change in the focus quality in the form of a decrease in contrast of features. But for best data quality, the features of interest should be clearly resolved. In some cases, a small feature such as surface texture, or an added features such as a projected pattern, might be used to obtain the 3D information, while the features that of interest to record may be larger features.

The plurality of handprint images at the different focal distances, the registration information, and the 3D shape information (i.e., range) is combined by control system/processor 38 in imaging device 14 to create a best composite image. As shown in the pictorial illustration of FIG. 4, the plurality of handprint images at the different focal distances 56, the registration information 58, and the 3D shape of the hand 60 are input into a super-resolution algorithm 62 stored on control system/processor 38 (FIG. 2) in order to generate the composite image 64. The redundant depth data and lateral image shifts (i.e., sub-pixel shifts) present in the handprint images permits roughly a doubling of the effective image resolution, or "super-resolution," of the composite handprint image 64. That is, a resolution of the handprint images 56 captured by camera 32 (FIGS. 2 & 3) can be increased in the composite handprint image 64 by roughly a factor of two, by inputting the plurality of handprint images at the different focal distances 56, the registration information 58, and the 3D shape information 60 into super-resolution algorithm 62, such that a composite image 64 including super resolution details is generated.

Figure 4:
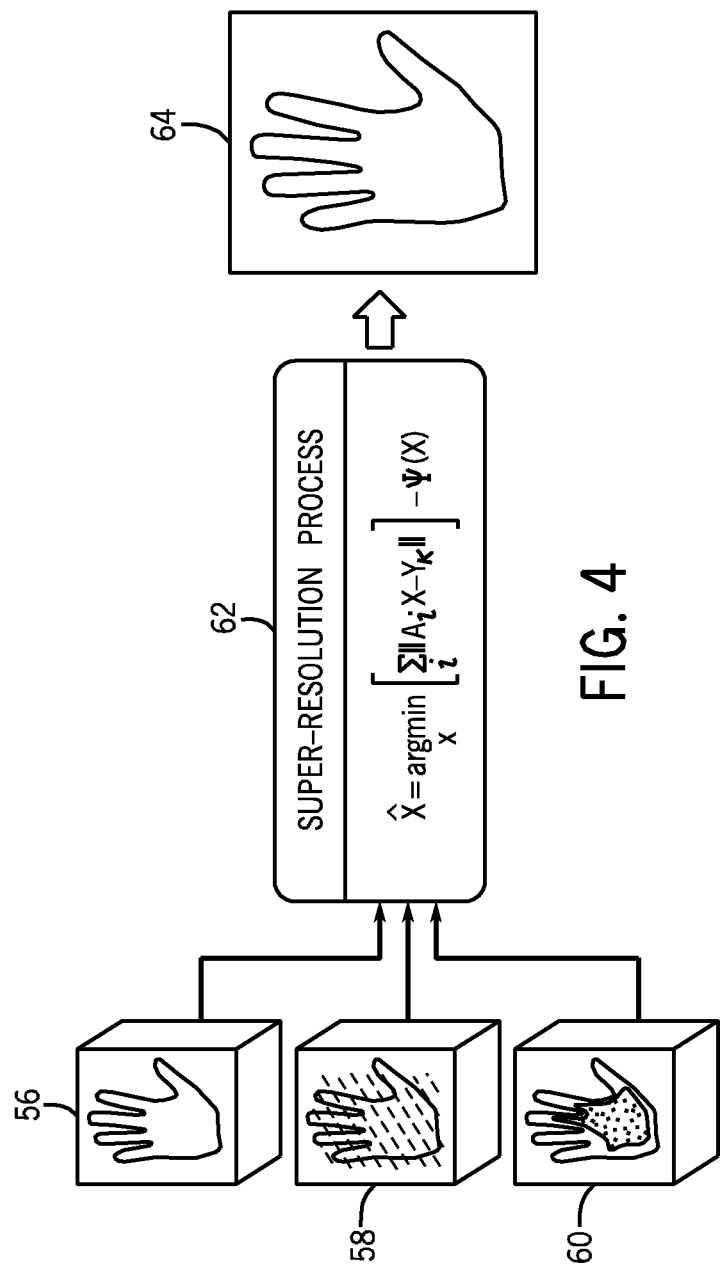
FIG. 4 is a process flow diagram used for generated a super-resolved composite handprint image at 1000 pixels-per-inch (PPI) according to an embodiment of the invention.

As shown in FIG. 4, the super-resolution algorithm 62 can be set forth as:

$$\hat{X} = \underset{x}{\operatorname{argmin}}\left[\sum_i \|A_iX - Y_i\|\right] + \Psi(X), \quad \text{[Eqn. 2]}$$

where $\hat{X}$ is the estimate of the ideal composite output image, found by minimizing the terms on the right, X is the ideal composite output image, $Y_i$ is the ith collected image, $A_i$ is the transformation of ideal composite output image accounting for the position/registration of the hand and the focal distance and camera blur as image i was collected, and $\Psi(X)$ is an optional additional regularization constraint on the ideal composite output image, such as to enforce some degree of smoothness.

According to an exemplary embodiment, application of the super resolution processing algorithm, and its use of the over sampling and redundant data capture readily provided by the system, results in a composite image having an increased spatial image resolution as compared to the resolution provided by the camera 32 in image capture device 14. According to one embodiment, the image resolution provided by implementing super resolution processing algorithm can be up to approximately twice that of the native resolution of camera 32. Thus, for example, the image resolution of the composite image may be 1000 pixels-per-inch (PPI), as compared to the lower native spatial image resolution of 500-600 PPI provided by the camera 32 in image capture device 14. A full hand composite handprint image 64 at 1000 PPI is generated, with up to a 50 millimeter (2-inch) working distance. With a 2.5 millimeter step, the handprint image set will contain at least 2 images where any particular feature can be expected to be imaged at 1000 PPI effective resolution. The 1000 PPI resolution of the composite handprint image is sufficient for biometric identification at level III performance levels, thus providing for image capture of fingerprint and palm print minutia details (minimum requirement of 500 PPI, Level II performance level) and perspiration pore details (minimum requirement of 1000 PPI, Level III performance level).

Figure 5:
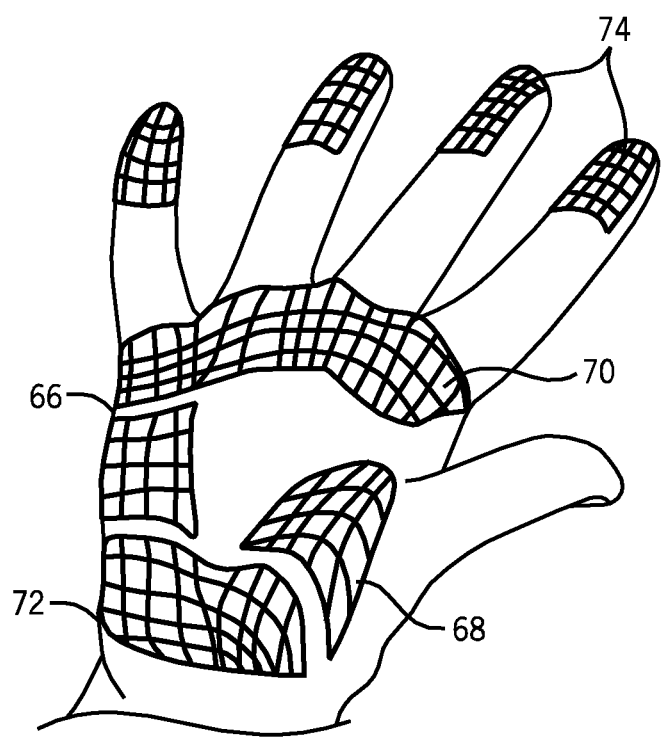
FIG. 5 is an illustration of a modeling technique for determining hand dimensions and curves for purposes of generating a handprint distortion map according to an embodiment of the invention.

Upon application of the super-resolution algorithm 62 to the handprint images 56, the registration information 58, and the 3D shape information 60, the resulting generated composite image 64 is unwrapped to translate the projection of the 3D hand image shape into a rolled equivalent print of the fingers and palm. A front projection viewed by the camera (i.e., the handprint images) and the detailed 3D model of the overall hand geometry obtained from the DFD calculation is used to generate an unrolled 2D image. The model used simulates image distortions corresponding to the reverse of the projection of the handprint surface on a two-dimensional projection obtained in a contact method. As shown in FIG. 5, in one embodiment, the distortion map may be based on a model of the hand illustrative of the convex and concave surfaces and significant local variations in convexity that make up the hand surface, such as the hypo-thenar 66, thenar 68, upper palm 70, lower palm 72, and fingerprint 74 surfaces. A generalized unwrapping algorithm is used for unwrapping the handprint from the distortion map. Multiple hand gestures (i.e., a flattened hand or a curled one) are accommodated by the large depth covered by the multiple handprint images and in the unwrapping algorithm. A key characteristic of the unwrapping algorithm and the use of the hand shape information is preserving distances between minutiae during the unwrapping.

The generation of a single, high resolution, two-dimensional rolled equivalent image of the handprint from the composite image by way of the unwrapping algorithm corrects for the shape of the palm and fingers to accommodate geometric correction of a handprint to match a contact print for better comparison to legacy data. The two-dimensional rolled equivalent image of the handprint can be easily compared to standard databases that store contact based handprints.

Embodiments of the invention thus provide a one shot, 1000 PPI, non-contact, mobile hand print (fingerprints and palm print) biometric capture system. The handprint collection device 10 improves rolled print collection in field conditions. The handprint collection device 10 is a full-hand, non-contact, biometric capture using the LCD and birefringent-based focus switching method, depth-from-defocus shape collection, and super-resolution image processing methods. A depth-from-defocus (DFD) approach is used to extract an enhanced 3D map of the hand from a limited number of captured defocused images. To provide robustness over the full range and diversity of hand images, the system captures at least 8 images over a range that covers the hand depth range. Small shifts in the image (i.e., lateral, sub-pixel shifts) and redundant imaging is used to provide improved spatial resolution (super resolution) of in-plane details. The 3D shape information of the hand is used to correct the print patterns relative to the curved shape of the fingers and palm, to provide the 2D equivalent of a contact, rolled print of the biometric information. The handprint collection device 10 is sufficiently fast to capture non-contact images of the hand with minimal aids with individual images being expected to have exposure times less than $\frac{1}{30}$ second, and with a total capture time of the 8-16 images taking less than 5 seconds.

Therefore, according to one embodiment of the invention, a contactless biometric data collection device includes an image capture device configured to capture whole handprint images of a subject hand in any of a range of positions and at each of a plurality of different focal distances, with the image capture device further including an imaging camera configured to capture the handprint images at a first image resolution level and an electro-optics arrangement positioned between the hand and the imaging camera, the electro-optics arrangement including a plurality of light modulating elements and polarization sensitive optical elements having an optical path length that changes with different polarization states, so as to provide for capture of the handprint images at each of the plurality of different focal distances. The contactless biometric data collection device also includes a control system coupled to the image capture device that is configured to cause the image capture device to capture the handprint images at each of the plurality of different focal distances, with each handprint image having a depth-of-focus that overlaps with a depth-of-focus of handprint images at adjacent focal distances such that redundant handprint image data is captured. The control system is further configured to register each handprint image with positional data so as to create pixel correspondence between the handprint images and between portions of the hand and create a composite handprint image from the registered handprint images captured at each of the plurality of different focal distances.

According to another embodiment of the invention, a method for collecting biometric data of a subject hand in a contactless manner includes capturing an image of at least a portion of the hand at each of a plurality of fixed focus positions by way of an image capture system, wherein each image includes at least one of a palm print and a plurality of fingerprints and wherein each image is captured at a first image resolution level. The method also includes registering the handprint images captured at the plurality of fixed focus positions to create pixel correspondence between the handprint images and combining the images captured at the plurality of fixed focus positions to form a composite image, wherein forming the composite image further includes inputting the images into an image processing algorithm, the images including redundant depth data and lateral image shifts between respective handprint images and generating the composite image from the image processing algorithm, the composite image having a second spatial resolution level that is increased from the first image resolution level.

According to yet another embodiment of the invention, a contactless handprint collection device for imaging a handprint includes a positioning assistance device configured to provide feedback to a subject to aid in positioning a hand of the subject to a desired imaging location and an image capture device configured to capture handprint images of the hand at each of a plurality of focus depths from the handprint, with the image capture device further including an imaging camera configured to capture the handprint images at a first spatial resolution level and an electro-optics arrangement positioned between the hand and the imaging camera, the electro-optics arrangement including a plurality of light modulating elements and polarization sensitive optical elements to provide for capture of the handprint images at each of the plurality of different focus depths. The contactless handprint collection device also includes a processor operably connected to the image capture device, with the processor being programmed to control the imaging device to capture handprint images at each of the plurality of focus depths, the handprint images including redundant depth data and lateral image shifts between respective handprint images. The processor is further programmed to register the handprint images captured at the plurality of focus depths to correlate the handprint images, determine a 3D shape of the hand using one of a depth from focus and a depth from defocus algorithm, process the registered handprint images and the 3D shape of the hand to form a composite handprint image having a second spatial resolution level that is increased from the first spatial resolution level of the handprint images, and generate a two-dimensional rolled equivalent image of the handprint from the composite image.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A contactless biometric data collection device comprising:
    an image capture device configured to capture images of a subject hand in any of a range of positions and at each of a plurality of different focal distances, each of the images comprising at least one of a palm print and a plurality of fingerprints, wherein the image capture device comprises:
        an imaging camera configured to capture the images at a first image resolution level; and
        an electro-optics arrangement positioned between the hand and the imaging camera, the electro-optics arrangement including a plurality of light modulating elements and polarization sensitive optical elements having an optical path length that changes with different polarization states, so as to provide for capture of the images at each of the plurality of different focal distances; and a control system coupled to the image capture device, the control system being configured to:
cause the image capture device to capture the images at each of the plurality of different focal distances, each image having a depth-of-focus that overlaps with a depth-of-focus of images at adjacent focal distances such that redundant image data is captured;
register each image with positional data so as to create pixel correspondence between the images and between portions of the hand;
create a composite image from the registered images captured at each of the plurality of different focal distances;
generate a depth map of the hand from the plurality of images captured at each of the different focal distances using one of a depth from focus algorithm and a depth from defocus algorithm;
determine a 3D shape of the hand using one of the depth from focus algorithm and the depth from defocus algorithm; and
determine a distortion map based on the 3D shape signifying local variations in convexity and concavity of the hand; and
unwrap the composite image using the distortion map to generate a single, high resolution image;
wherein the redundant image data includes depth data and lateral image shifts introduced by the polarization sensitive optical elements, the lateral images shifts comprising sub-pixel shifts between respective images captured at the plurality of different focal distances; and
wherein the images captured by the image capture device at each of the plurality of different focal distances and with the lateral image shifts introduced therein are captured in a 3D spiral pattern.

2. The contactless biometric data collection device of claim 1 wherein the composite image has a second image resolution level higher than the first image resolution level.

3. The contactless biometric data collection device of claim 2 wherein the second image resolution level is 1000 pixels-per-inch or more.

4. The contactless biometric data collection device of claim 2 wherein the control system is configured to:
input the images into a super-resolution algorithm, such that the depth data and lateral image shifts of the redundant image data is provided to the super-resolution algorithm; and
generate the composite image from the super-resolution algorithm, such that the spatial resolution of the composite image is increased from the first image resolution level of the images to the second image resolution level.

5. The contactless biometric data collection device of claim 1 wherein the image capture device further comprises a fixed reference target point projected onto the hand of the subject to correct the images for shifts of the hand relative to the camera, the fixed reference target point having a known location within any acquired image so as to provide the positional data for registering each image.

6. The contactless biometric data collection device of claim 1 wherein each image is separated in focal distance from other images by a set focus step, and wherein the depth-of-focus of each image is approximately equal to a size of the focus step.

7. The contactless biometric data collection device of claim 1 wherein the image capture device further comprises a strobed light source configured to emit pulses of light therefrom directed towards the handprint to enable a fast imaging sequence from capturing the images.

8. The contactless biometric data collection device of claim 1 wherein the light modulating elements comprise at least one of Faraday rotators, optoelectric crystals, wave plates, and liquid crystal panels (LCPs) and wherein the polarization sensitive optical elements comprise at least one of birefringent windows and birefringent lenses.

9. The contactless biometric data collection device of claim 1 wherein the image capture device further comprises a voltage source to apply voltage to the plurality of light modulating elements to change orientation states thereof, so as to rotate the linear polarization of light reflected from the handprint and vary an optical path length of the polarization sensitive optical elements to provide for capture of the images at each of the plurality of different focal distances; and
wherein the control system is configured to control the application of voltage to each of the plurality of light modulating elements to provide for capture of the images at each of the plurality of different focal distances.

10. The contactless biometric data collection device of claim 1 further comprising:
a user interface configured to provide feedback to the subject regarding a proximity of the hand to a desired imaging location; and
a proximity sensing system configured to determine the proximity of the hand to the desired imaging location and automatically trigger the image capture device when the hand is in the desired imaging location to provide for image capture.

11. The contactless biometric data collection device of claim 10 wherein the proximity sensing system further comprises a hand tracking device configured to track a location of the hand relative to the image capture devices so as to provide feedback to the subject regarding the proximity of the hand to the desired imaging location.

12. The contactless biometric data collection device of claim 1 wherein each image includes a plurality of fingerprints and a palm print.

13. The contactless biometric data collection device of claim 1 wherein the image capture device is configured to capture images at 8 different focal distances or 16 different focal distances.

14. A method for collecting biometric data of a subject hand in a contactless manner, the method comprising:
capturing an image of at least a portion of the hand at each of a plurality of fixed focus positions by way of an image capture system, wherein each image includes at least one of a palm print and a plurality of fingerprints and wherein each image is captured at a first image resolution level;
registering the images captured at the plurality of fixed focus positions to create pixel correspondence between the images;
combining the images captured at the plurality of fixed focus positions to form a composite image, wherein forming the composite image comprises:
inputting the images into an image processing algorithm, the images including redundant depth data and lateral image shifts between respective images; and
generating the composite image from the image processing algorithm, the composite image having a second spatial resolution level that is increased from the first image resolution level;

generating a depth map of the hand from the plurality of images captured at each of the different focal distances using one of a depth from focus algorithm and a depth from defocus algorithm;

determining a 3D shape of the hand using one of the depth from focus algorithm and the depth from defocus algorithm; and determining a distortion map based on the 3D shape signifying local variations in convexity and concavity of the hand; and unwrapping the composite image using the distortion map to generate a single, high resolution image;

wherein the lateral images shifts comprise sub-pixel shifts between respective images captured at the plurality of fixed focus positions; and wherein the images captured at each of the plurality of fixed focal positions and with the lateral image shifts therein are captured in a 3D spiral pattern.

15. The method of claim 14 further comprising:
registering the images captured at the plurality of fixed focus positions to create pixel correspondence between the images.

16. The method of claim 15 wherein registering the images captured at the plurality of fixed focus positions comprises:
projecting a fixed reference target point projected onto the hand of the subject; and
registering each image with positional data based on a location of the fixed reference target within each image, the fixed reference target point having a known location within each acquired image so as to provide pixel correspondence between the images.

17. The method of claim 15 wherein forming the composite image comprises:
inputting the registered images and the 3D shape into a super-resolution algorithm; and
generating the composite image from the super-resolution algorithm, with the composite image having the second spatial resolution level that is increased from the first image resolution level.

18. The method of claim 14 wherein each image is separated in depth from other images by a set focus step, and wherein the depth-of-focus of each image is approximately equal to a size of the focus step so as to provide for capture of the redundant depth data.

19. The method of claim 14 wherein capturing a handprint image at each of a plurality of fixed focus positions comprises capturing handprint images at 8 different fixed focus positions or 16 different fixed focus positions.

20. The method of claim 14 wherein capturing the images at each of the plurality of fixed focus positions comprises applying voltage to a plurality of liquid crystal panels (LCPs) in the electro-optics arrangement to change orientation states thereof, so as to rotate a linear polarization of light reflected from the hand and vary an optical path length of polarization sensitive optical elements in the electro-optics arrangement to provide for capture of the images at each of the plurality of fixed focus positions.

21. A contactless handprint collection device for imaging a handprint, the device comprising:

a positioning assistance device configured to provide feedback to a subject to aid in positioning a hand of the subject to a desired imaging location;

an image capture device configured to capture handprint images of the hand at each of a plurality of focus depths from the handprint, each of the handprint images comprising at least one of a palm print and a plurality of fingerprints, wherein the image capture device comprises:

an imaging camera configured to capture the handprint images at a first spatial resolution level; and an electro-optics arrangement positioned between the hand and the imaging camera, the electro-optics arrangement including a plurality of light modulating elements and polarization sensitive optical elements to provide for capture of the handprint images at each of the plurality of different focus depths; and a processor operably connected to the image capture device, the processor being programmed to:

control the imaging device to capture handprint images at each of the plurality of focus depths, the handprint images including redundant depth data and lateral image shifts between respective handprint images;

register the handprint images captured at the plurality of focus depths to correlate the handprint images;

determine a 3D shape of the hand using one of a depth from focus and a depth from defocus algorithm;

process the registered handprint images and the 3D shape of the hand to form a composite handprint image, the composite handprint image having a second spatial resolution level that is increased from the first spatial resolution level of the handprint images;

determine a distortion map based on the 3D shape signifying local variations in convexity and concavity of the hand; and generate a two-dimensional rolled equivalent image of the handprint from the composite image;

wherein the lateral image shifts comprise sub-pixel shifts between respective images captured at the plurality of focus depths; and wherein the images captured at each of the plurality of focus depths and with the lateral image shifts therein are captured in a 3D spiral pattern.

22. The contactless handprint collection device of claim 21 wherein each handprint image is separated in focus depth from other handprint images by a set focus step, and wherein the depth-of-focus of each handprint image is approximately equal to a size of the focus step so as to provide for acquisition of the redundant depth data.

23. The contactless handprint collection device of claim 21 wherein the processor is further programmed to:
input the registered handprint images and the 3D shape of the hand into a super-resolution algorithm; and
generate the composite image from the super-resolution algorithm.

24. The contactless handprint collection device of claim 21 wherein the processor is further programmed to apply an unwrapping algorithm to the composite image to generate the two-dimensional rolled equivalent image of the handprint, the unwrapping algorithm accounting for convex and concave surfaces of the handprint.

* * * * *